US007383966B2

(12) United States Patent
Ziesel

(10) Patent No.: US 7,383,966 B2
(45) Date of Patent: Jun. 10, 2008

(54) DISPENSING NOZZLE

(75) Inventor: Lawrence B. Ziesel, Woodstock, GA (US)

(73) Assignee: The Coca-Cola Company, Atlanta, GA (US)

( * ) Notice: Subject to any disclaimer, the term of this patent is extended or adjusted under 35 U.S.C. 154(b) by 1316 days.

(21) Appl. No.: 10/233,867

(22) Filed: Sep. 3, 2002

(65) Prior Publication Data

US 2004/0040983 A1 Mar. 4, 2004

(51) Int. Cl.
*G01F 11/00* (2006.01)
*B67D 5/56* (2006.01)

(52) U.S. Cl. ........................................ 222/1; 222/129.1

(58) Field of Classification Search ............. 222/129.1, 222/129.2, 129.3, 129.4, 132, 144.5, 145.5
See application file for complete search history.

(56) References Cited

U.S. PATENT DOCUMENTS 4,211,342 A * 7/1980 Jamgochian et al. .... 222/129.4
4,392,588 A * 7/1983 Scalera .................... 222/129.4
4,619,378 A * 10/1986 de Man ................... 222/144.5
4,821,925 A 4/1989 Wiley et al. ............. 222/129.4
5,000,357 A * 3/1991 Shannon et al. ......... 222/129.1
5,033,651 A 7/1991 Whigham et al. .......... 222/145
5,803,320 A * 9/1998 Cutting et al. ............. 222/641
6,253,963 B1 * 7/2001 Tachibana ................ 222/129.1
6,321,938 B1 11/2001 Edwards et al. ............... 222/1
6,345,729 B1 2/2002 Santy, Jr. ....................... 222/1
6,364,159 B1 4/2002 Newman et al. ............... 222/1

FOREIGN PATENT DOCUMENTS

AT 381 482 B 8/1984
EP 0 672 616 A2 3/1995

* cited by examiner

*Primary Examiner*—Kevin P. Shaver
(74) *Attorney, Agent, or Firm*—Sutherland Asbill & Brennan LLP

(57) ABSTRACT

A dispensing nozzle for mixing a first fluid and one or more second fluids to form a third fluid. The nozzle may include a first fluid pathway and a number of replaceable second fluid modules surrounding at least in part the first fluid pathway.

27 Claims, 7 Drawing Sheets

DISPENSING NOZZLE

TECHNICAL FIELD

The present invention relates generally to nozzles for beverage dispensers and more particularly relates to modular multi-flavor dispensing nozzles.

BACKGROUND OF THE INVENTION

Current post-mix beverage dispenser nozzles generally mix a stream of syrup, concentrate, bonus flavor, or other type of flavoring ingredient with water by shooting the stream down the center of the nozzle with the water flowing around the outside of the syrup stream. The syrup stream is directed downward with the water stream as the streams drop into the cup. The nozzle may be a multi-flavor or a single flavor nozzle. One known dispensing nozzle system is shown in commonly owned U.S. Pat. No. 5,033,651 to Whigham et al., entitled "Nozzle for Post Mix Beverage Dispenser", incorporated herein by reference.

A multi-flavor nozzle may rely upon a water flush across the bottom of the syrup chamber to clean the part and to prevent color carry over in subsequent beverages. Flavor carryover also may be a concern. This water flush, however, may not be effective with all types of syrups. As a result, there still may be some carryover from one beverage to the next. This concern is particularly an issue if the nozzle is first used for a dark colored beverage and then a clear beverage is requested.

Other issues with known nozzles include their adaptability for fluids with different viscosities, flow rates, mixing ratios, and temperatures. For example, beverages such as carbonated soft drinks, sports drinks, juices, coffees, and teas all may have different flow characteristics. Current nozzles may not be able to accommodate multiple beverages with a single nozzle design and/or the nozzle may be hard-plumbed for different types of fluid flow. As a result, modification of the over-all beverage dispenser may be difficult for different types of beverages.

There is a desire therefore for an improved multi-flavor beverage dispenser nozzle. The nozzle should be easy to use and should be reasonably priced with respect to known dispensing nozzles.

SUMMARY OF THE INVENTION

The present invention thus provides a dispensing nozzle for mixing a first fluid and one or more second fluids to form a third fluid. The nozzle may include a first fluid pathway and a number of replaceable second fluid modules surrounding at least in part the first fluid pathway.

Exemplary embodiment of the present invention may include the second fluid modules having a number of outlet holes. About six (6) to about thirty (30) outlet holes may be used. The outlet holes may be circular in shape with a diameter of about 0.03 inches (about 0.76 millimeters) to about 0.08 inches (about 2 millimeters). The outlet holes also may be triangular in shape with a similar area. The outlet holes may have lengths of about 0.03 inches (about 0.76 millimeters) to about 0.25 inches (about 6.35 millimeters). The outlet holes may have angles from the horizon of about thirty degrees (30°) to about ninety degrees (90°). The outlet holes may be angled to mix the second fluid into the first fluid.

The first fluid may include water. The second fluid may include syrup, concentrate, a bonus flavor, or other flavoring ingredients. The third fluid may include a cold beverage and the number of outlet holes may include a first predetermined orientation. The third fluid may include a hot beverage and the number of outlet holes may include a second predetermined orientation. The replaceable second fluid modules may include a first module with a first predetermined flow orientation and a second module with a second predetermined flow orientation.

A further exemplary embodiment of the present invention may provide a dispensing nozzle for mixing a water stream with one of a number of syrup streams. The nozzle may include a water module for providing the water stream. The water module may include a stream director for the water stream. The nozzle also may include a number of syrup modules surrounding the water module for directing one of the syrup streams towards the stream director and the water stream.

The stream director may include a number of ribs. The ribs may define a number of channels. A divider may be positioned within the channels. The stream director may include a water flow end and a syrup target end. The syrup modules may include a first module with a first predetermined flow orientation and a second module with a second predetermined flow orientation. The dispensing nozzle further may include a main body with a water pathway for the water stream. The main body may include means for replaceably attaching the water module and the syrup modules thereto. The syrup modules may include a bonus flavor module or a module for another flavoring ingredient.

A further exemplary embodiment of the present invention may provide a dispensing nozzle for mixing a water stream with one of a number of syrup streams. The dispensing nozzle may include a main body with a pathway for the water stream. A water module may be replaceably attached to the main body. The water module may include a stream director for directing the water stream as the stream leaves the water module. A number of syrup modules may be replaceably attached to the main body. The syrup modules may surround the water module for directing one of the syrup streams towards the stream director. The syrup modules may include a number of different flow configurations.

An exemplary method of the present invention may provide for mixing a water stream from a water module with a syrup stream from one of a number of syrup modules to form one of a number of beverage types. The method may include the steps of selecting the beverages types, determining the flow characteristics of each of the beverage types, providing a syrup module to accommodate the determined flow characteristics, surrounding at least in part the water module with the provided syrup modules, and flowing the water stream from the water module and the syrup stream from one of the syrup modules.

These and other features of the present invention will become apparent upon review of the following detailed description of the disclosed embodiments in connection with the drawings and the claims. It is to be understood that both the foregoing general description and the following detailed description are exemplary and explanatory.

DETAILED DESCRIPTION OF THE PREFERRED EMBODIMENT

Figure 1:
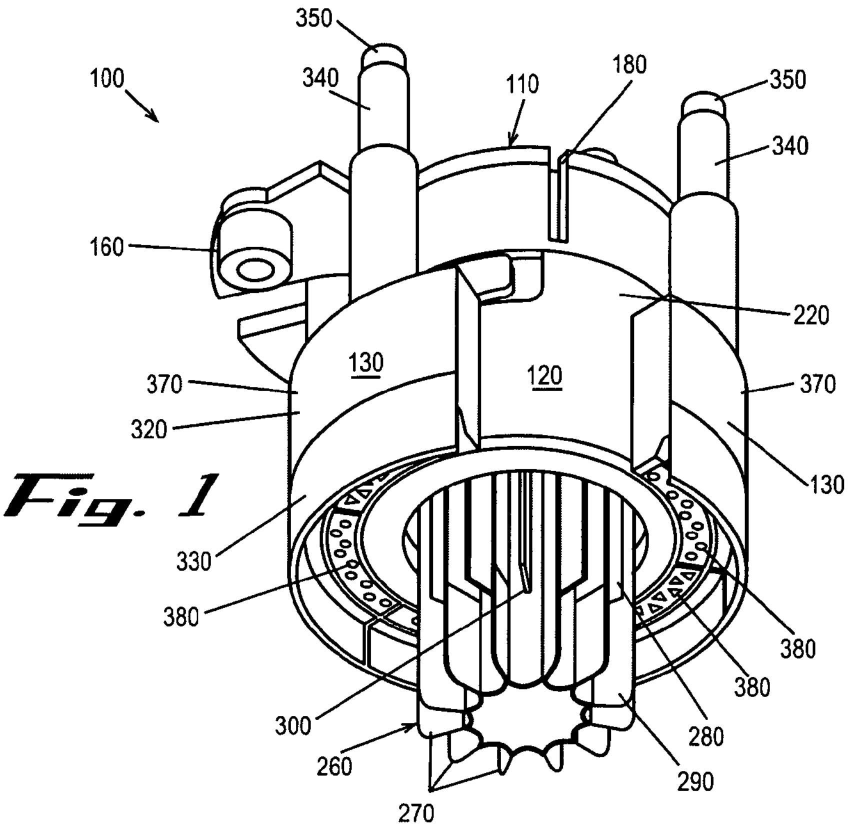
FIG. 1 is a perspective view of a dispensing nozzle of the present invention.
Figure 2:
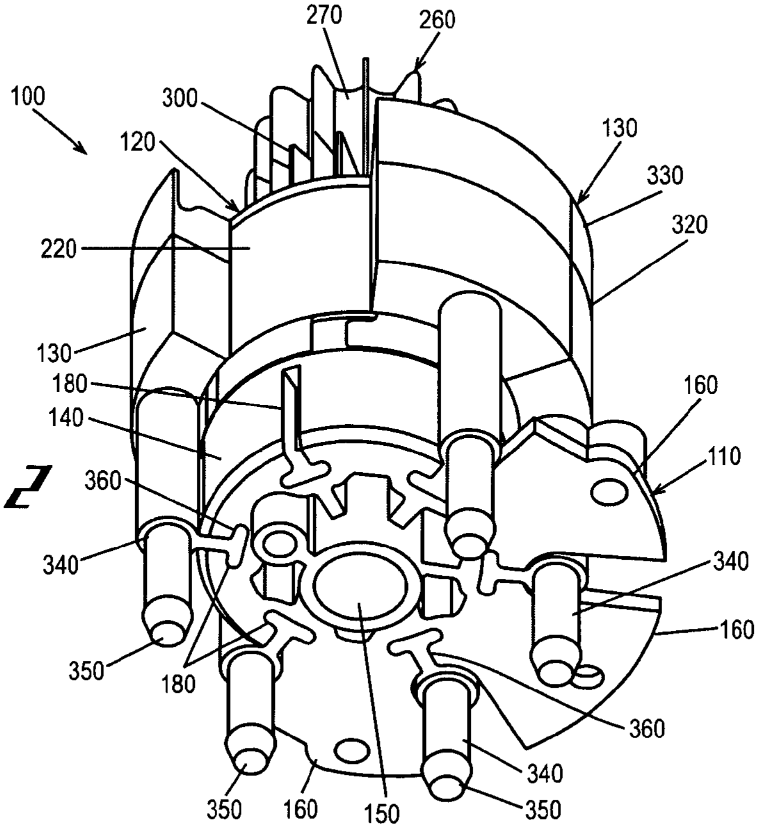
FIG. 2 is a further perspective view of the dispensing nozzle of FIG. 1.
Figure 3:
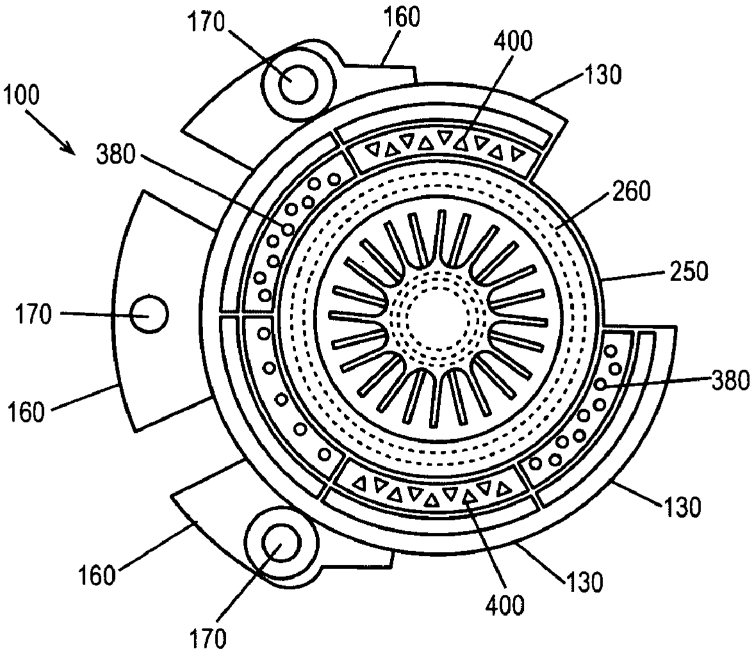
FIG. 3 is a bottom plan view of the dispensing nozzle of FIG. 1.
Figure 4:
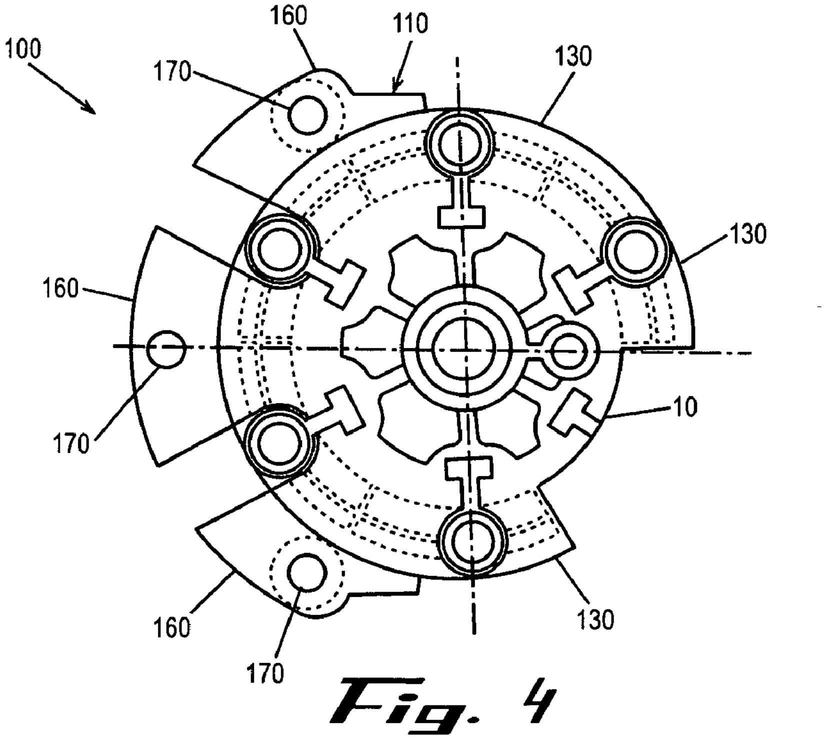
FIG. 4 is top plan view of the dispensing nozzle of FIG. 1.
Figure 5:
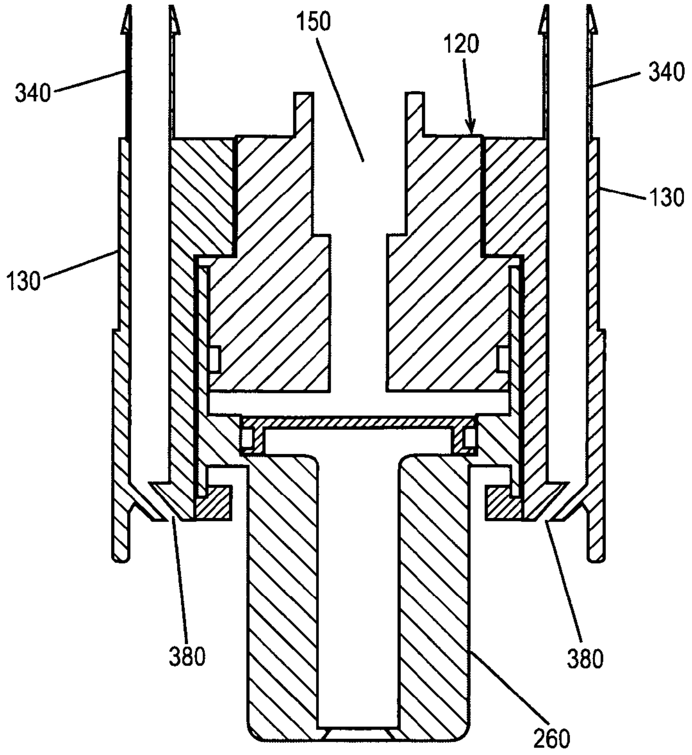
FIG. 5 is a side cross-sectional view of the nozzle of FIG. 1.

Referring now to the figures in which like parts represent like elements throughout the several views, FIGS. 1-5 show an example of a dispensing nozzle 100 of the present invention. The dispensing nozzle 100 may be used with any type of conventional post-mix beverage dispenser, including multi-flavor beverage dispensers. The present invention is not limited with respect to the type of beverage dispenser.

The dispensing nozzle 100 may include three main components, a main body 110, a water module 120, and a plurality of syrup modules 130. The main body 100 and the water module 120 may be separate or unitary elements. Other elements also may be used. Each of the elements of the dispensing nozzle 100 may be made out of a thermoplastic, metals, or similar types of materials. For example, thermoplastics such as Zytel (nylon resin) sold by E. I. du Pont de Nemours of Wilmington, Del. may be used for cold beverage applications. Similarly, thermoplastics such as Radel (Polyethersulfone) sold by BP Amoco Polymers of Chicago, Ill. may be used for hot or cold applications. Likewise, other types of thermoplastics such as polyethylene, polypropylene, or similar materials also may be used. The material preferably may be food grade.

Figure 6:
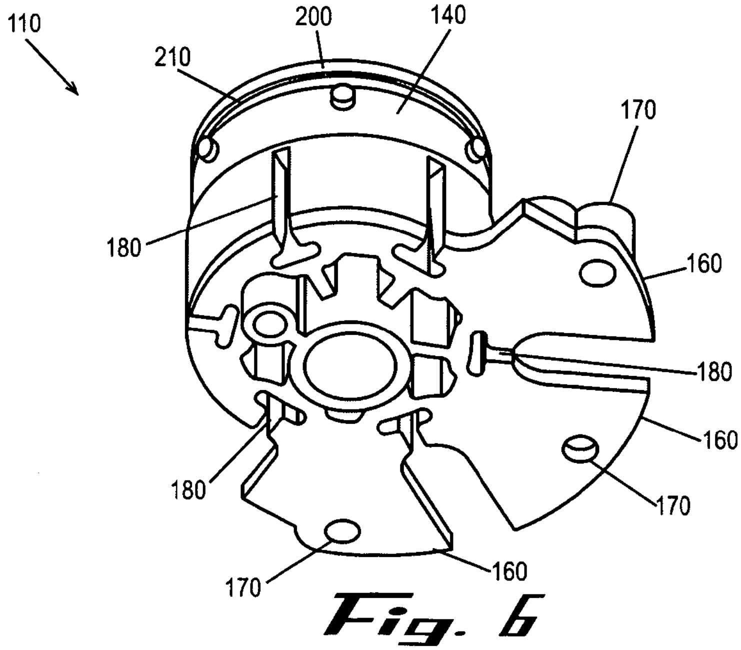
FIG. 6 is a perspective view of the main body of the dispensing nozzle of FIG. 1.
Figure 7:
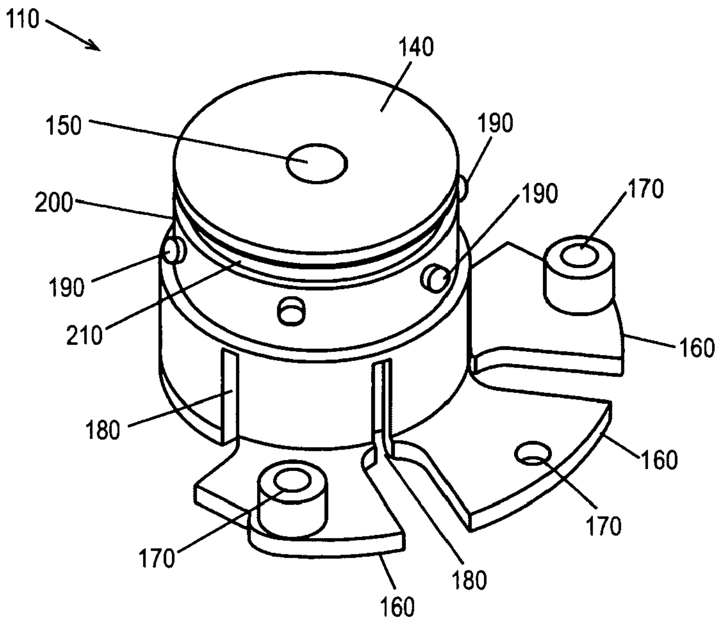
FIG. 7 is a further perspective view of a main body of the dispensing nozzle of FIG. 1.

An example of the main body 110 is shown in FIGS. 6 and 7. The main body 110 may be directly connected to the water circuit of a conventional beverage dispenser (not shown). The main body 110 may include a body element 140. The body element 140 is shown to be circular but may take any convenient shape. The body 140 may define a water pathway 150 therethrough. Again, the water pathway 150 is shown as circular but may take any convenient shape. The water pathway 150 may be attached directly to the water circuit of the beverage dispenser. More than one pathway 150 may be used. For example, one pathway 150 may be used for still water and one pathway 150 may be used for soda water (carbonated water). We use the term "water" herein to refer to either or both still and/or soda water.

The main body 110 may have several flanges 160 attached to the body 140. Although three (3) flanges 160 are shown, any number of flanges 160 or other type of attachment means may be used. The flanges 160 each may include a central aperture 170 so as to attach the main body 110 to the beverage dispenser via screws or other types of connection means. The main body 110 also may include a number of grooves 180 positioned within the body 140. The grooves 180 in this example are largely "T"-shaped, although any convenient shape may be used. The grooves 180 permit the attachment of the syrup modules 130 as will be described in more detail below. The main body 110 also may include a number of protrusions 190. The protrusions 190 in this example are largely button-shaped, although any convenient shape may be used. The protrusions 190 permit the attachment of the water module 120 as will be described in more detail below. The main body 110 also may have a circular indent 200 or a similar structure positioned along the body 140. The circular indent 200 may be filled with an O-ring 210 or a similar structure so as to provide a watertight seal with the water module 120.

Figure 8:
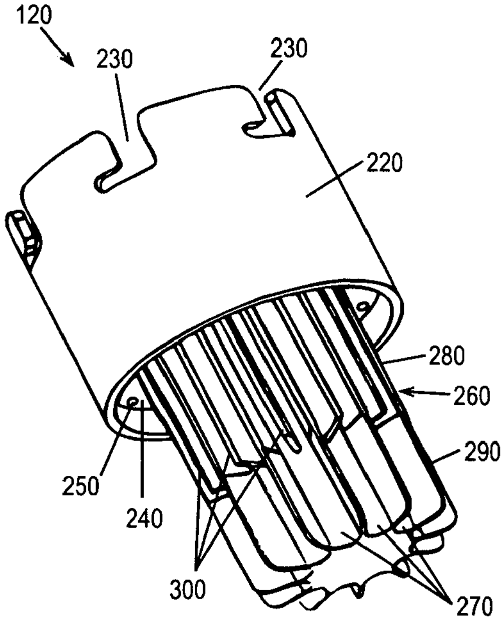
FIG. 8 is a perspective view of the water module of the dispensing nozzle of FIG. 1.

FIG. 8 shows an example of the water module 120. The water module 120 may include an upper cylinder 220. The upper cylinder 220 is shown to be circular but may take any convenient shape. The upper cylinder 220 may be substantially hollow. The upper cylinder 220 may define more than one internal chamber depending upon, for example, the number of water pathways 150 used. The upper cylinder 220 may include a number of indentations 230. The indentations 230 may be sized to accept the protrusions 190 of the main body 110 such that the water module 120 may be attached to the main body 110. The indentations 230 are shown as substantially L-shaped such that the water module 120 may be twisted into position. Any other convenient shape may be used. Any other type of attachment method may be used.

The upper cylinder 220 also may have an outlet 240. The outlet 240 may be substantially circular in shape and extend around the inner perimeter of the upper cylinder 220. The outlet 240 may include a number of outlet holes 250 that extend within the upper cylinder 220 to the exterior of the water module 120. The number, size, shape, and length of the outlet holes 250 may vary. In this example, the water module 120 may include about twelve (12) to about sixty (60) outlet holes 250 with each outlet hole 250 being about 0.03 inches (about 0.76 millimeters) to about 0.25 inches (about 6.35 millimeters) in diameter and 0.03 inches (about 0.76 millimeters) to about 0.25 inches (about 6.35 millimeters) in length. The outlet holes 250 may be straight or angled.

Positioned beneath the upper cylinder 220 may be a number of ribs 260. The ribs 260 may form pairs of ribs so as to define substantially U or V-shaped channels 270 adjacent to each or several of the outlet holes 250. Each channel 270 may accommodate one or a number of the outlet holes 250. Each rib 260 may have an upper portion 280 and a lower portion 290. The upper portion 280 of each rib 260 or pairs of ribs 260 may function largely to stabilize the flow of plain water and/or reduce the water velocity and subsequent foaming with respect to soda water. The lower portion 290 of each rib 260 or pair of ribs 260 largely may function as a syrup target as will be explained in more detail below. Positioned within each channel 270 may be a divider 300. The divider 300 may divide the channel 270 adjacent to each of or several of the outlet holes 250 so as to provide further stabilization to the water flow. The divider 300 may only extend along the upper portion 280 of the ribs 260. The lower portion 290 of the ribs 300 thus allows several water streams to merge while acting as the syrup target.

In this embodiment, the ribs 260 may have a thickness of about 0.03 inches (about 0.76 millimeters) to about 0.125 inches (about 3.175 millimeters). The ribs 260 may extend from the upper cylinder 220 by about 0.75 inches (about 19 millimeters) to about 1.75 inches (about 44.5 millimeters)

The divider 300 may have a similar thickness and may extend about half the distance from the upper cylinder 220. Any convenient size or shape may be used.

Figure 9:
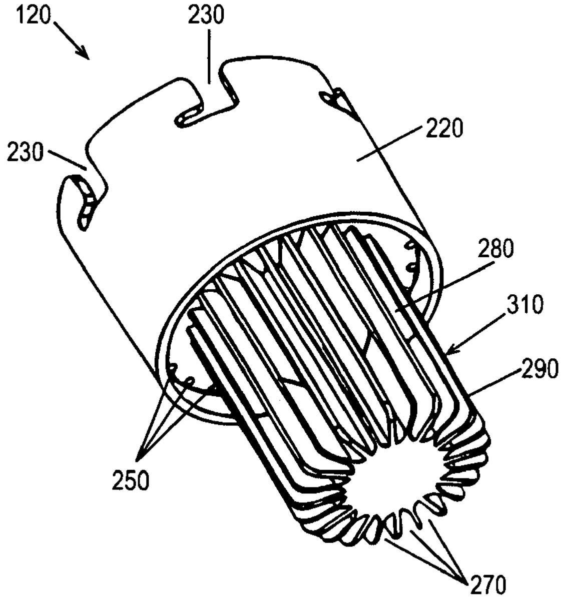
FIG. 9 is a perspective view of an alternative embodiment of the water module.
Figure 10:
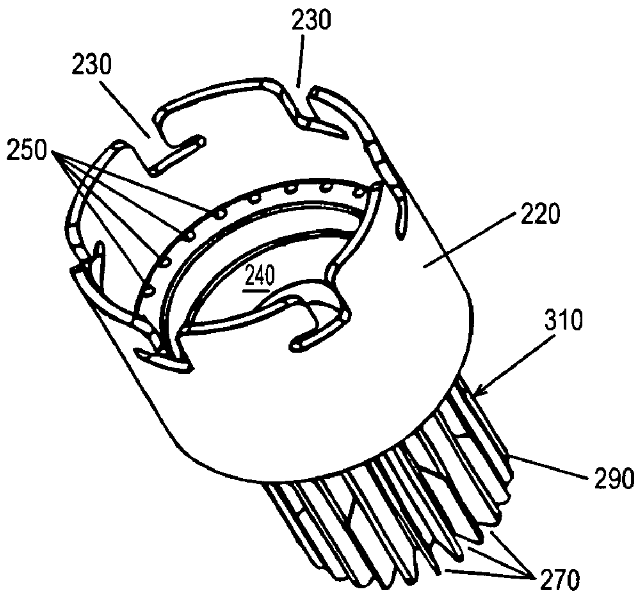
FIG. 10 is a further perspective view of the alternative embodiment of the water module of FIG. 9.
Figure 11:
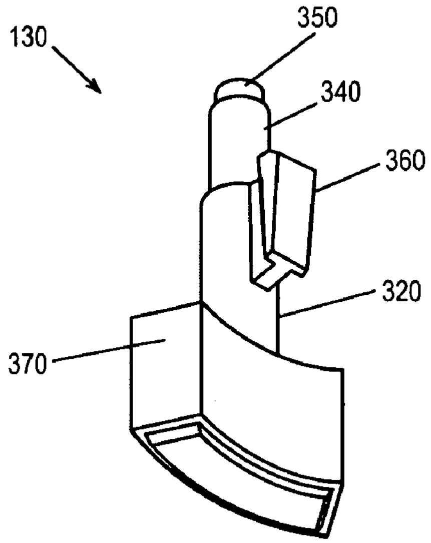
FIG. 11 is a perspective view of a syrup module of the dispensing nozzle of FIG. 1.
Figure 12:
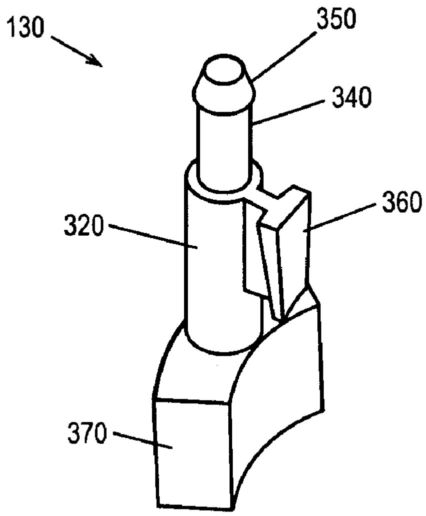
FIG. 12 is a further perspective view of the syrup module of the dispensing nozzle of FIG. 1.

FIGS. 9 and 10 show an alternative embodiment of the water module 120. In this embodiment, the water module 120 may include a number of ribs 310 with approximately twice the number of channels 270 as was described above with the ribs 260. In this case, the channels 270 therein are about half as wide. The dividers 300 may not be used in this embodiment. The upper portion 280 of the ribs 300 thus also acts to stabilize the plain water flow and to reduce the water flow velocity and foaming in the soda water flow in a manner similar the ribs 260.

FIGS. 11-14 show an example of one of the syrup modules 130. Each module 130 may include a main body portion 320 and an outlet portion 330. Each main body portion 320 may include an upper cylinder 340. The upper cylinder 340 may be connected directly to a syrup circuit within a conventional beverage dispenser. The upper cylinder 340 may include a barb 350 so as to provide a watertight connection to the syrup circuit. The upper cylinder 340 also may include a connection element 360. The connection element 360 allows the syrup module 130 to be positioned within the grooves 180 of the main body 110. In this case, the connection element 360 is substantially T-shaped so as to be positioned within a similarly shaped groove 180 within the main body 110. The connection element 360, however, may take any convenient shape. Alternatively, the syrup modules 130 may be attached to the water module 120.

The main body 320 also may include an expansion chamber 370. The expansion chamber 370 may be substantially hollow. The expansion chamber 370 may provide for substantially smooth syrup flow through the outlet portion 330.

Figure 13:
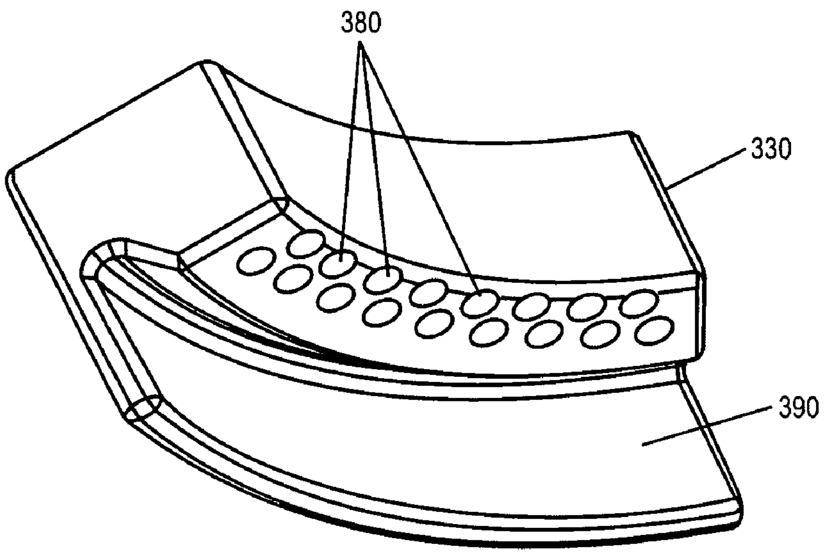
FIG. 13 is a perspective view of an outlet portion of the syrup module.
Figure 14:
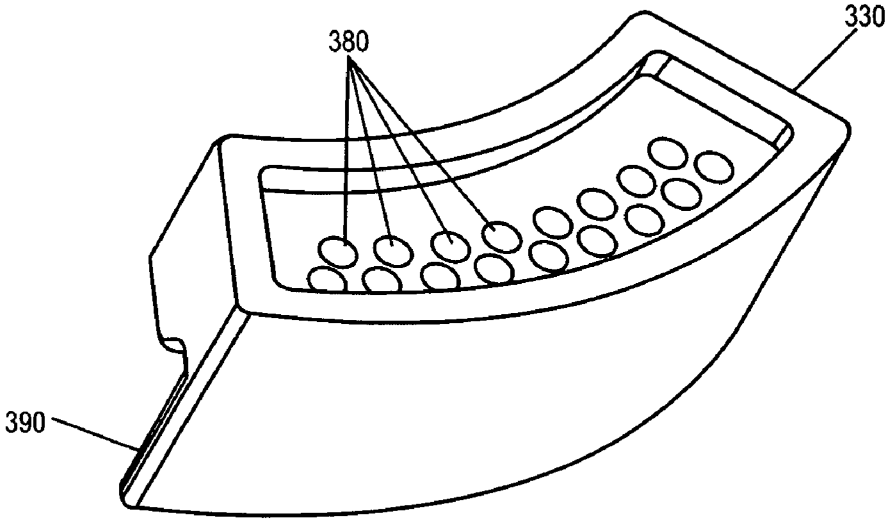
FIG. 14 is a further perspective view of the outlet portion of the syrup module.

FIGS. 13 and 14 show one embodiment of the outlet portion 330. The outlet portion 330 may include a number of outlet holes 380. The number, size, shape, length, and angle of the outlet holes 380 may vary greatly and may be customized according to the nature of the syrup or other fluid intended to be used therein. The pressure of the fluid flow therein also may vary the design of the holes 380. Although the outlet holes 380 are shown as circular, any convenient shape may be used. The outlet holes 380 may range in number from about six (6) to about thirty (30). The outlet holes 380 may have a diameter of about 0.03 inches (about 0.76 millimeters) to about 0.08 inches (about 2 millimeters). The length of the outlet holes 380 also may vary. The outlet holes 380 may have a length of about 0.03 inches (about 0.76 millimeters) to about 0.25 inches (about 6.35 millimeters). The outlet holes 380 preferably are angled such that the syrup is shot at the lower portion 290 or the target area of the ribs 260. The angle of the outlet holes 380 may range from thirty degrees (30°) to about ninety degrees (90°) from the horizon. It is important to note that the size, shape, orientation, and other characteristics of the outlet holes 380 may vary greatly from the examples herein.

The outlet 330 also may include a skirt 390. The skirt 390 may extend the width of the outlet 330 and extend below the outlet holes 380 by about 0.03 inches (about 0.76 millimeters) to about 0.5 inches (about 12.7 millimeters).

Figure 15:
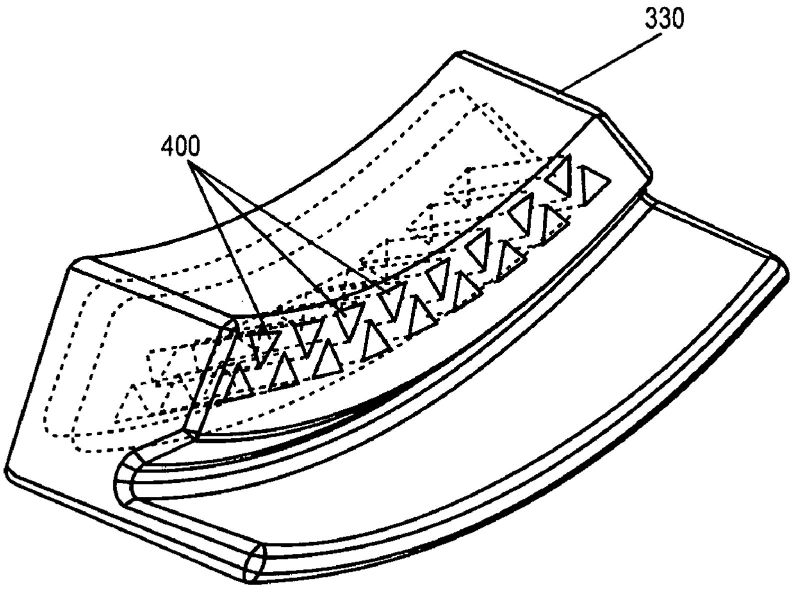
FIG. 15 is a perspective view of an alternative embodiment of the outlet portion of the syrup module.
Figure 16:
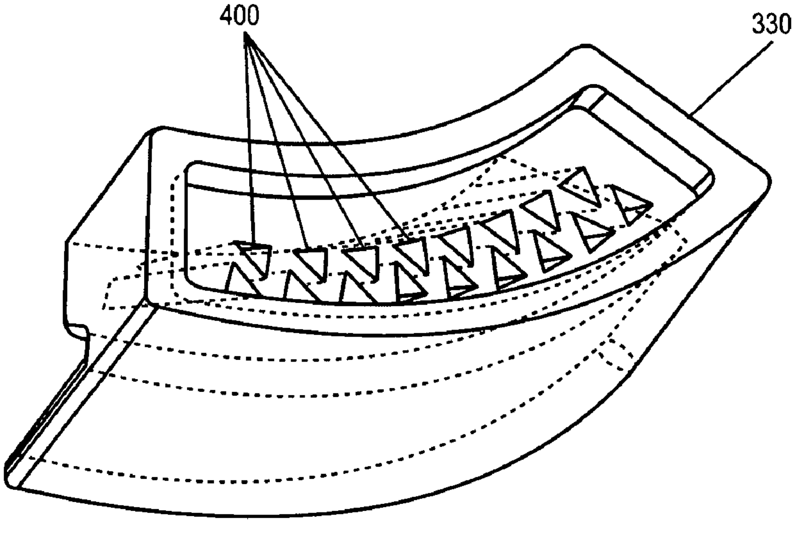
FIG. 16 is a further perspective view of the alternative embodiment of the outlet portion of the syrup module.

FIGS. 15 and 16 show an alternative embodiment of the outlet 330. In this embodiment, the outlet includes a number of triangularly shaped outlet holes 400. The number, size, shape, length, and angle of the outlet holes 400 also may be varied. Each of the outlet holes 400 may have a similar area to that of the outlet holes 380 described above.

In use, the main body 110 is connected to the beverage dispenser with the water pathway 150 connecting to the water circuit. The main body 110 may be secured via screws or similar types of fastening means passing through the central aperture 170 of the flanges 160. The water module 120 then may be positioned on the main body 110 by aligning the indentations 230 of the upper cylinder 340 with the protrusions 190 of the main body 110. The water module 120 thus may be easily installed or removed.

A number of the syrup modules 130 may then be positioned on the main body 110. Any number of syrup modules 130 may be used. In the examples of FIGS. 1-5, five (5) syrup modules 120 may be used. In this embodiment, up to six (6) modules may be used. The syrup modules 130 may be connected to the main body 110 by sliding the connection element 360 within the grooves 180 of the main body 110. The upper cylinder 340 of each syrup module 130 may then be attached to a syrup circuit of the beverage dispenser via the flange lip 350.

Each syrup module 130 may have a differently configured outlet 330. The number, size, shape, length, and angle of the outlet holes 380 therein may vary according to the viscosity or other flow characteristics of the syrup or other fluid therein. The outlet holes 380 also may vary according to whether the beverage is to be served hot or cold. For example, the angle of the outlet holes 380 may be varied to improve mixing or foam height or to control color carry over. One dispensing nozzle 100 thus may accommodate beverages of different flow characteristics and temperature and may easily be modified for any desired use. A syrup module 130 configured with an outlet 330 for a first type of flow characteristic may easily be replaced with a syrup module 130 with an outlet 330 configured for a second type of flow characteristic. The syrup modules 130 also may be used with a bonus flavor, i.e., a vanilla or a cherry flavor additive, or any other type of flavoring ingredient. Other possibilities include sugar, other sweeteners, cream, and any other type of additive.

By way of example only, a carbonated soft drink may use about seventeen (17) outlet holes 380 with diameters of about 0.044 inches (about 1.12 millimeters). The outlet holes 380 may have about a thirty-seven degree (37°) angle from the horizon. The outlet holes 380 for a bonus flavor may extend at approximately eighty-five degrees (85°) downward.

When a beverage is ordered from the beverage dispenser, the water circuit and the syrup circuits therein are activated. The water proceeds through the water module 120 via the upper cylinder 220. The water then proceeds through the outlet holes 250 of the outlet 240 and travels down along the channels 270 of ribs 260. The upper portion 280 of the ribs 260 may stabilize the plain water flow and reduce the water flow velocity and subsequent foaming with respect to soda water. The water may flow at about one (1) ounce to about six (6) ounces per second (about 29.6 milliliters to about 177.4 milliliters per second). Any convenient flow rate may be used.

While the water is flowing along the ribs 260, syrup flows from one of the syrup circuits of the beverage dispenser to one of the syrup modules 130. The syrup enters the upper cylinder 340 and passes into the expansion chamber 370. The syrup then flows through the outlet 330 via the specifically sized, shaped, numbered, and angled outlet holes 380. The syrup may flow at about 0.5 ounces to about two (2) ounces per second (about 14.8 milliliters to about 59.2 milliliters per second). The flow rate will depend upon the nature of the syrup or other fluid. Any convenient flow rate may be used.

The syrup passes through the outlet holes 380 at an angle such that the syrup is shot at the lower portion 290 of the ribs 260. The ribs 260 and the channels 270 help reduce the tangential velocity of the syrup and direct the syrup downward towards the consumer's cup. The syrup thus penetrates the water stream so as to provide good mixing with the water stream. Specifically, the use of the lower portion 290 of the ribs 260 helps promote good mixing such that the fluid stream has the appropriate uniform appearance with respect to color. Further, because the syrup flow is not in the center of the nozzle 100 as in known designs, it is less likely that stray droplets of syrup will be forced or sucked into the water stream in subsequent discharges.

Because the syrup modules 350 are replaceable and interchangeable, the syrup modules 130 may be easily exchanged to accommodate different types of beverages with respect to viscosity, fluid flow characteristics, and temperature. Likewise, the syrup modules 130 and the water module 120 also may be easily removed for cleaning and/or repair. The dispensing nozzle 100 thus provides the user with a vastly improved beverage dispenser system that may be easily modified.

It should be apparent that the foregoing relates only to the preferred embodiments of the present invention and that numerous changes and modifications may be made herein without departing from the spirit and scope of the invention as defined by the following claims.

I claim:

1. A dispensing nozzle for mixing a first fluid and one or more second fluids to form a third fluid, comprising:
- a first fluid pathway; and
- a plurality of replaceable second fluid modules surrounding at least in part said first fluid pathway;
- wherein each of said plurality of replaceable second fluid modules comprises a plurality of outlet holes.

2. The dispensing nozzle of claim 1, wherein said plurality of outlet holes comprises about six (6) to about thirty (30) outlet holes.

3. The dispensing nozzle of claim 1, wherein said plurality of outlet holes comprises a circular hole.

4. The dispensing nozzle of claim 3, wherein said plurality of circular holes comprises a diameter of about 0.03 inches (about 0.76 millimeters) to about 0.08 inches (about 2 millimeters).

5. The dispensing nozzle of claim 1, wherein said plurality of outlet holes comprises a triangular hole.

6. The dispensing nozzle of claim 1, wherein said plurality of outlet holes comprises an angle from the horizon of about thirty degrees (30°) to about ninety degrees (90°).

7. The dispensing nozzle of claim 1, wherein said plurality of outlet holes comprises a length of about 0.03 inches (about 0.76 millimeters) to about 0.25 inches (about 6.35 millimeters).

8. The dispensing nozzle of claim 1, wherein said plurality of outlet holes are angled to mix the second fluid into the first fluid.

9. The dispensing nozzle of claim 1, wherein the first fluid comprises still or carbonated water.

10. The dispensing nozzle of claim 1, wherein the second fluid comprises syrup or concentrate.

11. The dispensing nozzle of claim 1, wherein the second fluid comprises a flavoring ingredient.

12. The dispensing nozzle of claim 1, wherein the third fluid comprises a cold beverage and wherein said plurality of outlet holes comprises a first predetermined orientation.

13. The dispensing nozzle of claim 1, wherein the third fluid comprises a hot beverage and wherein said plurality of outlet holes comprises a second predetermined orientation.

14. The dispensing nozzle of claim 1, wherein said plurality of replaceable second fluid modules comprises a first module with a first predetermined flow orientation and a second module with a second predetermined flow orientation.

15. A dispensing nozzle for mixing a water stream and one of a number of syrup streams, comprising:
- a water module for providing the water stream;
- said water module comprising a stream director for the water stream; and
- a plurality of syrup modules surrounding said water module for directing the one of a number of syrup streams towards the stream director.

16. The dispensing nozzle of claim 15, wherein said stream director comprises a plurality of ribs.

17. The dispensing nozzle of claim 16, wherein said plurality of ribs defines a plurality of channels.

18. The dispensing nozzle of claim 17, wherein said stream director comprises a plurality of dividers, one of said plurality of dividers positioned within one of said plurality of channels.

19. The dispensing nozzle of claim 15, wherein said stream director comprises a water flow end and a syrup target end.

20. The dispensing nozzle of claim 15, wherein each of said plurality of syrup modules comprises a plurality of outlet holes.

21. The dispensing nozzle of claim 20, wherein said plurality of syrup modules comprises a first module with a first predetermined flow orientation and a second module with a second predetermined flow orientation.

22. The dispensing nozzle of claim 15, further comprising a main body, said main body comprising a water pathway for the water stream.

23. The dispensing nozzle of claim 22, wherein said main body comprises means for replaceably attaching said water module thereto.

24. The dispensing nozzle of claim 22, wherein said main body comprise means for replaceably attaching said plurality of syrup modules thereto.

25. The dispensing nozzle of claim 15, wherein said plurality of syrup modules comprises a module for a bonus flavor or other flavoring ingredient.

26. A dispensing nozzle for mixing a water stream and one of a number of syrup streams, comprising:
- a main body with a pathway for the water stream;
- a water module replaceably attached to said main body;
- said water module comprising a stream director for directing said water stream as it leaves said water module; and
- a plurality of syrup modules replaceably attached to said main body;
- said plurality of syrup modules surrounding said water module for directing the one of a number of syrup streams towards the stream director;
- said plurality of syrup modules comprising a plurality of different flow configurations.

27. A method for mixing a water stream from a water module with a syrup stream from one of a number of syrup modules to form one of a number of beverage types, comprising:
- selecting the beverages types;
- determining the flow characteristics of each of the beverage types;
- providing a syrup module to accommodate the determined flow characteristics;
- surrounding at least in part the water module with the provided syrup modules; and
- flowing the water stream from the water module and the syrup stream from one of the syrup modules.

* * * * *